US006803110B2

(12) United States Patent
Drees et al.

(10) Patent No.: US 6,803,110 B2
(45) Date of Patent: Oct. 12, 2004

(54) DECORATIVE LAMINATE ASSEMBLY AND METHOD FOR PRODUCING SAME

(75) Inventors: Terry Paul Drees, Crescent Springs, KY (US); Kenneth John Laurence, Hamilton, OH (US); Kevin Francis O'Brien, Cincinnati, OH (US)

(73) Assignee: Formica Corporation, Warren, NJ (US)

( * ) Notice: Subject to any disclaimer, the term of this patent is extended or adjusted under 35 U.S.C. 154(b) by 74 days.

(21) Appl. No.: 09/767,556

(22) Filed: Jan. 22, 2001

(65) Prior Publication Data

US 2002/0146954 A1 Oct. 10, 2002

(51) Int. Cl.[7] .......................... B32B 27/00; B32B 27/40; B32B 27/36; B32B 29/02; D06N 7/04

(52) U.S. Cl. ................................ 428/423.7; 428/425.1; 428/147; 428/165; 428/913.3; 442/394; 442/395; 442/412; 442/417

(58) Field of Search ................................ 428/147, 219, 428/165, 210, 211, 411.1, 423.7, 425.1, 913.3; 442/287, 288, 290, 293, 295, 300, 395, 398, 389, 412, 417, 171, 394, 386

(56) References Cited

U.S. PATENT DOCUMENTS

| | | | | | |
|---|---|---|---|---|---|
| 3,798,111 | A | | 3/1974 | Lane et al. | |
| 3,936,341 | A | | 2/1976 | Nanoux | |
| 4,255,480 | A | | 3/1981 | Scher et al. | |
| 4,322,468 | A | * | 3/1982 | Raghava | 428/204 |
| 4,443,507 | A | | 4/1984 | Yamada et al. | |
| 4,517,235 | A | | 5/1985 | Ungar et al. | |
| 4,520,062 | A | | 5/1985 | Ungar et al. | |
| RE32,152 | E | | 5/1986 | Scher et al. | |
| 4,713,138 | A | | 12/1987 | Ungar et al. | |
| 4,816,314 | A | | 3/1989 | Prawdzik et al. | |
| 4,855,165 | A | | 8/1989 | Bolgiano et al. | |
| 4,880,689 | A | * | 11/1989 | Park et al. | 427/393.5 |
| 4,931,324 | A | | 6/1990 | Ellison et al. | |
| 4,963,214 | A | | 10/1990 | Iwata et al. | |
| 5,037,694 | A | | 8/1991 | Ungar et al. | |
| 5,141,799 | A | * | 8/1992 | Mehta et al. | 156/307.4 |
| 5,643,666 | A | | 7/1997 | Eckart et al. | |
| 5,780,147 | A | | 7/1998 | Sugahara et al. | |
| 6,030,705 | A | * | 2/2000 | Buoniconti et al. | 428/412 |
| 6,093,473 | A | | 7/2000 | Min | |
| 6,096,410 | A | | 8/2000 | Okajima et al. | |
| 6,159,331 | A | | 12/2000 | Chou | |

FOREIGN PATENT DOCUMENTS

| | | | |
|---|---|---|---|
| DE | 3839335 | A1 | 6/1989 |
| DE | 19610079 | A1 | 9/1996 |
| EP | 0186257 | A2 | 7/1986 |
| EP | 0477203 | B1 | 4/1992 |
| EP | 0561086 | A1 | 9/1993 |
| EP | 0 783 962 | | 7/1997 |
| JP | 3286856 | | 12/1991 |
| JP | 4101846 | | 4/1992 |
| JP | 9300553 | | 11/1997 |
| JP | 10000747 | | 1/1998 |
| JP | 2000233480 | | 8/2000 |
| JP | 2000325565 | | 11/2000 |

OTHER PUBLICATIONS

International Search Report dated Jan. 2, 2002 (3 pages).

* cited by examiner

*Primary Examiner*—Cheryl A. Juska
*Assistant Examiner*—Lynda Salvatore
(74) *Attorney, Agent, or Firm*—Mayer, Brown, Rowe & Maw LLP

(57) ABSTRACT

A decorative laminate assembly having a decorative laminate top layer assembly. This top layer assembly includes, in descending superimposed relationship, a decorative layer and a core layer that includes PETG. Preferably, the top layer assembly also includes a wear resistant overlay layer on top of the decorative layer, and the core layer's PETG is in a sheet form. The top layer assembly is attached to a water resistant substrate through the use of a water resistant adhesive. The decorative laminate assembly of the present invention can be used for a variety of purposes, including flooring applications. When the present invention is used for flooring applications, it is preferred that the overlay layer include wear resistant qualities and that the water resistant substrate comprise PVC or cement fiberboard.

56 Claims, 1 Drawing Sheet

DECORATIVE LAMINATE ASSEMBLY AND METHOD FOR PRODUCING SAME

FIELD OF THE INVENTION

The present invention relates generally to decorative laminate assemblies and methods for producing the same, and more specifically, decorative laminate assemblies with enhanced moisture resistance and dimensional stability, which qualities are particularly useful in flooring applications where there will be repeated or prolonged exposure to moisture or water.

BACKGROUND OF THE INVENTION

Decorative laminates have been used as a surfacing material for many years, in both commercial and residential applications, where pleasing aesthetic effects in conjunction with desired functional behavior (such as superior wear, heat and stain resistance, cleanability and cost) are preferred. Typical applications have historically included, while not limited to, furniture, kitchen countertops, table tops, store fixtures, bathroom vanity tops, cabinets, wall paneling, office partitions, and the like.

More recently, the applications for decorative laminates have been expanded to include their use as a flooring material in lieu of more expensive real wood, stone or ceramic tile, less sanitary and rugged carpeting, as well as less aesthetically attractive vinyl tile or linoleum-like products. However, as discussed in more detail below, existing decorative laminates are not particularly suited in applications where there is repeated or prolonged exposure to moisture and/or water due to their intrinsic hydrophilic properties. Such existing laminates have therefore been primarily limited to residential applications having dry conditions. Accordingly, as discussed further below, there is a need for a decorative laminate that can be used where there is repeated or prolonged exposure to moisture and/or water, thereby overcoming the deficiencies present in existing decorative laminates.

In general, decorative laminates can be classified into two broad categories, namely high pressure decorative laminates (HPDL) and low pressure decorative laminates (LPDL). As defined by the industry's governing body, the National Electrical Manufacturers Association (NEMA) in their Standards Publication LD 3-1995, high pressure decorative laminates are manufactured or "laminated" under heat and a specific pressure of more than 750 psig. Conversely, low pressure decorative laminates are typically manufactured at about 300 psig specific pressure to avoid excessive crushing of their substrate material. The other broad distinction between high pressure and low pressure decorative laminates is that the former are generally relatively thin, typically comprising a decorative surface and a phenolic resin impregnated kraft paper core, and are not self supporting as manufactured. As such they are normally bonded, with a suitable adhesive or glue, to a rigid substrate such as a particleboard or medium density fiberboard (MDF), as a separate step during final fabrication of the end product. Conversely, low pressure decorative laminates are typically comprised of a similar type of decorative surface, without the supporting core layer, which is bonded to a substrate such as particleboard or MDF in a single laminating or "pressing" operation during its manufacture.

Both high pressure and low pressure decorative laminates have historically been manufactured in heated, flat-bed hydraulic presses. With the exception of some newer types of processing equipment, high pressure laminates are typically pressed as multiple sheets in press "packs" or "books" in a multi-opening press (which is usually steam or high pressure hot water heated, and water cooled), with a 30 to 60 minute thermal cycle and 130° C. to 150° C. top temperature. On the other hand, low pressure decorative laminates are typically pressed as a single sheet or "board" in a single opening press (which is usually thermoil or electrically heated) using an isothermal, hot discharge "short cycle" of 30 to 60 seconds with press heating platen temperatures of 180° C. to 220° C. Continuous laminating or "double belt" presses for decorative laminate manufacture blur the above distinctions somewhat, in that their "cycle" times and temperatures are similar to those employed for low pressure decorative laminates. In such a process, pressures are intermediate, typically in the range of 300 to 800 psig, while the continuous laminates themselves are relatively thin, without direct bonding to a substrate material and thus requiring a second fabrication step to do so as is the case with conventional high pressure decorative laminates. The process and product dissimilarities delineated above, as well as more subtle process differences, will be appreciated by those versed in the art.

High pressure decorative laminates are generally comprised of a decorative sheet layer, which is either a solid color or a printed pattern, over which is optionally placed a translucent overlay sheet, typically employed in conjunction with a print sheet to protect the print's ink line and enhance abrasion resistance, although an overlay can be used to improve the abrasion resistance of a solid color as well. A solid color sheet typically consists of alpha cellulose paper containing various pigments, fillers and opacifiers, generally with a basis weight of 50 to 120 pounds per 3000 square foot ream. Similarly, print base papers are also pigmented and otherwise filled alpha cellulose sheets, usually lightly calendered and denser than solid color papers to improve printability, and lower in basis weight at about 40 to 75 pounds per ream, onto which surface is rotogravure or otherwise printed a design using one or more inks. Conversely, overlay papers are typically composed of highly pure alpha cellulose fibers without any pigments or fillers, although they can optionally be slightly dyed or "tinted", and are normally lighter in basis weight than the opaque decorative papers, in the range of 10 to 40 pounds per ream.

For high wear applications (such as flooring), it is often desirable to have a more highly wear resistant top layer. Accordingly, the overlay papers may contain hard, abrasive, mineral particles such as silicon dioxide (silica), and preferably aluminum oxide (alumina), which is included in the paper's furnish during the papermaking process. Alternatively, the abrasive particles can be coated on the surface of the overlay or decorative papers, during the "treating" process described below, prior to the final lamination step. Further, the abrasive particles can be added to the resin which is used to impregnate the overlay or decorative layers, thus causing the abrasive particles to be deposited on, and to a lesser extent, dispersed within such layers. As is known in the art, if the abrasive particles are deposited on the decorative layer, a separate overlay layer may not be necessary.

Typically, these overlay and decorative print and solid color surface papers are treated, or impregnated, with a melamine-formaldehyde thermosetting resin, which is a condensation polymerization reaction product of melamine and formaldehyde, to which can be co-reacted or added a variety of modifiers, including plasticizers, flow promoters, catalysts, surfactants, release agents, or other materials to improve certain desirable properties during processing and after final press curing, as will be understood by those skilled in the art. As with melamine-formaldehyde resin preparation and additives thereto, those versed in the art will also appreciate that other polyfunctional amino and aldehydic compounds can be used to prepare the base resin, and other thermosetting polymers, such as polyesters or acrylics, may be useful as the surface resin for certain applications.

Optionally, an untreated decorative paper can be used in conjunction with a treated overlay, provided the overlay contains sufficient resin to flow into and contribute to the adjacent decorative layer during the laminating process heat and pressure consolidation so as to effect sufficient interlaminar bonding of the two, as well as bonding of the decorative layer to the core. The equipment used to treat these various surface papers is commercially available and well known to those skilled in the art. The papers are normally treated to controlled, predetermined resin contents and volatile contents for optimum performance as will be well understood by those versed in the art, with typical resin contents in the ranges of 64–80%, 45–55% and 35–45% for overlay, solid color and print (unless used untreated) papers respectively, and all with volatile contents of about 5–10%. Overlay and decorative surface papers used with a low pressure process usually employ higher resin contents and catalyst concentrations (and/or stronger catalysts) to compensate for the lower pressure and resultant poorer resin flow, and the short thermal cure cycle, during the pressing operation.

The surface papers (i.e., the overlay and decorative layers) of a high pressure decorative laminate are simultaneously bonded to the core during the pressing operation. The core of a conventional high pressure decorative laminate is typically comprised of a plurality of saturating grade kraft paper "filler" sheets, which have been treated or impregnated with a phenol-formaldehyde resin, which also simultaneously fuse and bond together during the laminating process, forming a consolidated, multi-lamina unified composite or laminate. Phenol-formaldehyde resins are condensation polymerization reaction products of phenol and formaldehyde. Again, those versed in the art will appreciate that a variety of modifiers such as plasticizers, extenders and flow promoters can be co-reacted with, or added to, the phenol-formaldehyde resin, that other phenolic and aldehydic compounds can be used to prepare the base resin, or that other types of thermosetting resins such as epoxies or polyesters may be used. A phenol-formaldehyde resin, however, is generally preferred in the manufacture of conventional high pressure decorative laminates, as is the use of a saturating grade kraft paper, generally with a basis weight of 70–150 pounds per ream, although other materials such as linerboard kraft paper, natural fabrics, or woven or nonwoven glass, carbon or polymeric fiber clothes or mats may also be used as the core layer, either by themselves or in combination with kraft paper. In any case, these core layers must either be treated with a resin that is chemically compatible with the "primary" filler resin (and surface resin if used adjacent to it), or if used untreated, sufficient resin must be made available from adjacent filler plies to contribute to it and insure adequate interlaminar bonding. The filler resin preparation procedures, and filler treating equipment and methodologies, are also well known to those skilled in the art. With a conventional low pressure process, typically a core layer is not used, and the decorative surface components are bonded directly to a substrate material rather than to an intermediate core layer.

During the HPDL laminating or pressing operation, the various surface and filler sheets or laminae are cured under heat and pressure, fusing and bonding them together into a consolidated, unitary laminate mass, albeit asymmetric in composition throughout its thickness. As mentioned previously, typically this process is accomplished in a multi-opening, flat bed hydraulic press between essentially inflexible, channeled platens capable of being heated and subsequently cooled while under an applied pressure.

Typically in such a press, back-to-back pairs of collated laminate assemblies (with means of separation as described below), each consisting of a plurality of filler sheets and one or more surface sheets, are stacked in superimposed relationship between rigid press plates or "cauls", with the surfaces adjacent to the press plates. As is known in the art, such press plates are typically fashioned from a heat-treatable, martensitic stainless steel alloy such as AISI 410, and can have a variety of surface finishes which they impart directly to the laminate surface during the pressing operation, or they can be used in conjunction with a non-adhering texturing/release sheet positioned between the laminate surface components and the press plate, which will impart a selected finish to the laminate surface during pressing as well (and is later stripped off and discarded).

Typically, several pairs of laminate assemblies or "doublets" are interleaved between several press plates, supported by a carrier tray, to form a press pack or "book". The laminate pairs between the press plates are usually separated from each other by means of a non-adhering material such as a wax or silicone coated paper, or biaxially oriented polypropylene (BOPP) film, which are commercially available. Alternatively, the backmost face of one or both of the laminates' opposed filler sheets in contact with each other is coated with a release material such as a wax or fatty acid salt. Each press pack, so constructed, is then inserted, by means of its carrier tray, into an opening or "daylight" between two of the heating/cooling platens of the multi-opening, high pressure flat bed press. The press platens are typically heated by direct steam, or by high pressure hot water, the latter usually in a closed-loop system, and are water cooled.

A typical press cycle, once the press is loaded with one or more packs containing the laminate assemblies and press plates, entails closing the press to develop a specific pressure of about 1000–1500 psig, heating the packs at a predetermined rate to about 130–150° C., holding at that cure temperature for a predetermined time, then cooling the packs to or near room temperature, and finally relieving the pressure before unloading the packs on their carrier trays from the press. Those skilled in the art will have a detailed understanding of the overall pressing operations, and will recognize that careful control of the laminate's cure temperature and its degree of cure are critical in achieving the desired laminate properties (as are the proper selection of the resin formulations and papers used in the process).

After the pressing operation has been completed, and the press packs discharged from the press, the press plates are removed sequentially from the press pack build-up for reuse, and the resultant laminate doublets separated into individual laminate sheets. In a separate operation, these must then be trimmed to the desired size, and the back sides sanded so as to improve adhesion during subsequent bonding to a substrate. With a continuous laminating process, the trimming and sanding operations, and sheeting if desired, are usually done in-line directly after heat and pressure consolidation and curing between the rotating double belts. Conversely, with a conventional low pressure pressing operation, usually removal of unpressed surface paper edge "flash" is the only finishing step required.

As noted above, a relatively recent development in the building and design industries has been the growing widespread acceptance of using decorative laminates in flooring applications. Such flooring products, simulating stone or ceramic tiles, or wood planks, are most commonly produced either by adhering a conventional high pressure decorative laminate surfaced with a wear resistant overlay, as described in detail above, to a medium density fiberboard (MDF) or a premium grade high density fiberboard (HDF) substrate. Alternatively, the flooring composite material is pressed directly using a one-step low pressure process, again with an abrasive overlay protecting the decorative surface sheet and using MDF or HDF as the substrate. The fiberboard substrates are used in lieu of particleboard or other coarser, less expensive substrates due to the exacting machining requirements for the flooring product's tongue and groove or integral "snap lock" edge treatment joining systems that are most commonly used with these products.

However, even with the more expensive HPDL clad flooring products, and using the best grades of "moisture resistant" HDF substrate (in which the board is produced at higher resin content with more moisture resistant resins), and even sized with wax and other "repellents", serious application restrictions and problems persist with the current generation of these most widely used flooring products when exposed to repeated or prolonged contact with moisture or water. These deficiencies are due to their intrinsic hydrophilic, in fact hygroscopic, characteristics, as such products are comprised for the most part of cellulosic wood fibers. These deficiencies are compounded by the non-isomorphic, directional orientation of these fibers inherent to the papermaking and fiberboard manufacturing processes.

Indeed, even the best moisture resistant HDF grades will expand an average of about 0.075% along its machine direction ("MD") and cross-machine direction ("CD") for each 1% increase in its equilibrium moisture content. HDF in its original state, as produced by a mill and used by a flooring manufacturer, has an average moisture content of about 6%. With a non-moisture contributing subfloor, such as lauan plywood, under the best conditions of low relative humidity "RH" (~10% RH) and high ambient temperature, the flooring HDF substrate moisture content will increase to about 7% (a+1% increase). On the other extreme, with the same type of subfloor and conditions of high humidity (~90% RH) and low ambient temperature, the HDF substrate moisture content will increase to about 9% (a+3% increase). Typically, more moderate temperature and humidity conditions will result in an increase in the floor's HDF substrate moisture content to about 8% (a+2% increase). The practical consequences of this increase in the floor's HDF substrate moisture content, and resultant increase in its overall dimensions, are summarized in Table I below. The expansion figures shown below are an average of the expansion changes in both the MD and CD directions.

TABLE I

| Subfloor | RH | Temp. | Moisture Content | Increase | Expansion With Room Dimension 10 ft. | 20 ft. | 30 ft. |
|---|---|---|---|---|---|---|---|
| HDF (from Mill) | — | — | 6% | — | — | — | — |
| HDF | Low | High | 7% | 1% | 0.09" | 0.18" | 0.27" |
| HDF | Mod. | Mod. | 8% | 2% | 0.18" | 0.36" | 0.54" |
| HDF | High | Low | 9% | 3% | 0.27" | 0.54" | 0.81" |

On the other hand, a traditional high pressure decorative laminate used as cladding (i.e., the laminated overlay, decorative and core layers) will lose moisture under low humidity conditions and shrink in both its MD and CD, and absorb moisture under high humidity conditions and grow in both its MD and CD dimensions. The NEMA specification LD 3–3.11 for dimensional change for VGS grade laminate (nominal thickness 0.028 inch "vertical grade standard"), which would typically be used to clad HDF for flooring applications, is 0.7% maximum in the machine direction and 1.2% maximum in the cross-machine direction in terms of total dimensional movement from low humidity conditions (less than 10% relative humidity at 70° C.) to high humidity conditions (90% relative humidity at 40° C.). Assuming equilibrium at ambient conditions of 50% relative humidity (midway for the test method), the laminate under high humidity conditions can grow 0.35% in the machine direction, and 0.60% in the cross-machine direction, with the consequences illustrated in Table II below:

TABLE II

| Relative Humidity | Direction | % Change | Expansion With Room Dimensions 10 ft. | 20 ft. | 30 ft. |
|---|---|---|---|---|---|
| 10% | MD | −0.35 | −0.42" | −0.84" | −1.26" |
| 10% | CD | −0.60 | −0.72" | −1.44" | −2.16" |
| 50% | MD | 0 | — | — | — |
| 50% | CD | 0 | — | — | — |
| 90% | MD | +0.35 | +0.42" | 0.84" | 1.26" |
| 90% | CD | +0.60 | +0.72" | +1.44" | +2.16" |

The relatively poor moisture resistance of the high pressure decorative laminate is primarily related to the phenol-formaldehyde ("phenolic") resin impregnated core layer, in part because it comprises the majority of the laminate bulk and normally has a greater cellulose fiber to resin ratio than the surface components, and partly because of the more hydrophilic nature of "modern" water-solvated phenolic resin systems. Simply increasing the phenolic resin content in the core sufficiently to significantly improve moisture resistance is not practical since it would result in increased resin flow and bleed-out during pressing, as well as possible resin bleed-through into the laminate surface. Conversion to a more hydrophobic, organic solvent based modified phenolic resin is prohibited because of environmental considerations, and both alternatives are precluded because of their increased cost.

Thus, while the dimensional movement of the total floor assembly will be governed predominantly by the much greater mass of the HDF substrate, under high humidity and moisture, and in particularly wet, conditions, the greater movement of the flooring's HPDL cladding could warp convex and buckle the individual floor tiles or planks, lifting them off the subfloor.

Considering the recognized deficiencies in the current, most popularly used high and low pressure decorative laminate/HDF-based flooring products, they perform reasonably well in "small room", low humidity, moisture and water environments (generally termed "residential applications"), where the effects of the compounded dimensional changes of the individual floor segments on the entire installation can be tolerated, if not controlled. Even with such installations, flooring manufacturers and installers typically recommend inclusion of (necessarily raised) expansion joints a minimum of every 20 feet to avoid buckling of the floor with any moisture uptake, although such expansion joints are aesthetically unattractive and physically intrusive. Accordingly, wet area installations, such as bathrooms, are not generally recommended.

Floor moisture protection is commonly attempted by recommending use of an underlayment between the subfloor and the new floor, which is typically comprised of foam materials sandwiched between polymeric films. These so called "floating floor" installations only help control the rate, not the total equilibrium amount, of moisture uptake from underneath the flooring panels and create the disadvantages of restricting spilled water drainage from above through the joints (thus permeating into the peripheral HDF substrate, which can cause severe swelling in those areas). Further, such installations impart a hollow sounding, springy feel to the entire floor when walked upon. The one important advantage of a floating floor installation, however, is that the foam inclusions act as shock absorbers and significantly improve the floor's impact resistance; the decorative laminate assembly itself having inherently very poor impact resistance if installed directly on a hard, rigid subfloor without the underlayment.

The deficiencies in existing decorative laminate are exacerbated when such conventional, decorative laminate clad HDF floors are installed on concrete (which is typical for commercial applications). The use of such existing decorative laminates in commercial applications has been largely avoided because of their aforementioned moisture and water sensitivity. Indeed, a newly poured and set concrete floor will typically generate about 14 pounds of water per 1000 square feet per day (14 lbs./1000 sq. ft./day), and HDF in contact with such a floor will reach an equilibrium moisture content of about 18%. Even an old, fully cured concrete floor on "dry" ground will continue to transmit water at an average rate of about 3 lbs./1000 sq. ft./day and result in a HDF moisture content of about 14%. Above about 12% moisture content in the HDF, Fail the concern is not only dimensional change, but actual physical swelling and degradation of the fiberboard itself, as well as fungal and mildew damage. Furthermore, in areas with a high water table, such as southern Florida, where a typical house is built on a concrete slab without a basement, even old concrete transmits moisture at a rate similar to that for new concrete, with the same deleterious effects to HDF-based flooring. As such, these "wet area" residential and commercial flooring applications have largely been relegated to vinyl composition tiles and the like products. While they have the prerequisite moisture resistance and dimensional stability, by their very nature, they are quite soft and easily dented by heavy or impacted objects, and decorative designs are severely restricted to abstract stone-like patterns and the like.

U.S. Pat. No. 6,093,473 ("Min") proposes a HPDL clad flooring assembly, utilizing a moisture resistant polymeric substrate (in particular, PVC), in conjunction with essentially a conventional high pressure decorative laminate cladding with the typical phenolic resin impregnated kraft paper based core, which only addresses part of the problem posed by conventional HPDL clad flooring assemblies (i.e., only addresses the problems associated with the HDF substrate).

A melamine-formaldehyde ("melamine") surface resin, when sufficiently cured, has intrinsically good moisture resistance, as evidenced by the performance of such articles as molded melamine dinnerware. Thus, it is considered desirable to retain a melamine resin in the surface of an improved flooring product because of its moisture resistance as well as its other superior properties such as its color and clarity, hardness, heat and cigarette resistance, light stability and fade resistance, cleanability and optical compatibility with alumina inclusions required for enhanced abrasion and wear resistance. However, simply using a melamine resin, with its superior moisture resistance, in the core of the laminate, as well as in the surface, is precluded since they are most compatible with cellulosic, non-polymeric materials (which inherently degrade moisture resistance), and melamine resins are intrinsically brittle, such that the resultant laminate's stress crack and impact resistance would be deleteriously affected further, as would its machinability.

Further, while the use of an unsaturated and crosslinkable polyester "laminating" resin impregnated woven or non-woven glass, carbon or polymeric fiber cloth or mat, as is known in the art, could possibly improve moisture resistance and flexibility of the laminate core, this type of core would have several disadvantages. Such disadvantages would be relatively high cost, difficult processibility with conventional HPDL filler treating equipment, serious environmental problems, the core would still be comprised of a discontinuous moisture barrier, and such polyesters would be incompatible with the desired requisite melamine surface resin, curing by free radical rather than condensation polymerization. While the latter problem could be technically circumvented with use of a bridging agent or "tie sheet" as taught in U.S. Pat. No. 6,159,331 ("Chou"), which has both unsaturated polyester and melamine resin curing functionality, such materials are difficult to synthesize and expensive, and as such, best avoided if possible.

Accordingly, there remains a need for a moisture resistant and dimensionally stable decorative laminate assembly, and in particular, a decorative laminate cladding that can be used where there is repeated or prolonged exposure to moisture or water.

Further, thin, conventional decorative laminate claddings, with a phenolic resin impregnated kraft paper core, are by their very nature quite brittle and easily fractured. In the flooring assembly, where such a laminate is bonded to a PVC material (which is relatively soft and easily deformed), impact resistance is very poor. Indeed, a ball impact test of the product produced in accordance with Min results in instantaneous denting of the substrate and simultaneous circumferential cracking of the laminate cladding. Thus, there is a further need for a tougher, more impact resistant decorative laminate cladding.

Accordingly, in view of the above, there is a need for a decorative laminate flooring assembly with improved moisture resistance and dimensional stability, as well as improved toughness, impact resistance and durability, that will offer a wide variety of design choice to the architect and consumer. Such a decorative laminate has not heretofore been provided.

SUMMARY OF THE INVENTION

The aforementioned needs are fulfilled by a decorative laminate assembly having a decorative laminate top layer assembly. This top layer assembly includes, in descending superimposed relationship, a decorative layer and a core layer that includes PETG. Preferably, the top layer assembly also includes a wear resistant overlay layer on top of the decorative layer, and the core layer's PETG is in a sheet form. The top layer assembly is attached to a water resistant substrate through the use of a water resistant adhesive. The decorative laminate assembly of the present invention can be used for a variety of purposes, including flooring applications. When the present invention is used for flooring applications, it is preferred that the overlay layer include wear resistant qualities and that the water resistant substrate comprise PVC or cement fiberboard.

DETAILED DESCRIPTION OF THE INVENTION

While the present invention is capable of embodiment in various forms, there is shown in the following drawings, and will be hereinafter described, a presently preferred embodiment, with the understanding that the present disclosure is to be considered as an exemplification of the invention, and is not intended to limit the invention to the specific embodiment illustrated.

Figure 1:
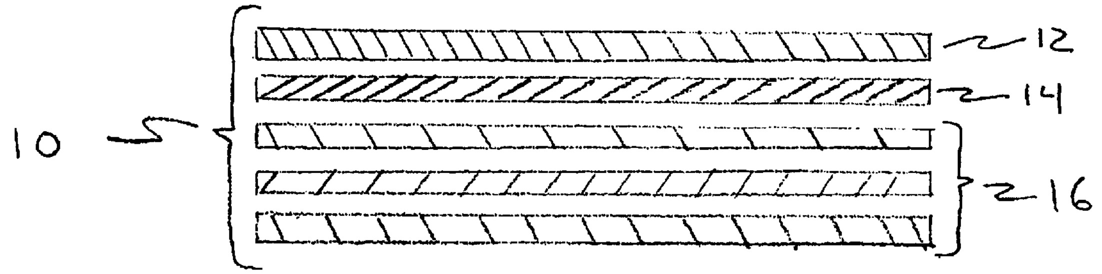
FIG. 1 is a partial, cross-sectional, exploded, elevational view of the components of a conventional high pressure decorative laminate.

FIG. 1 shows a conventional high pressure decorative laminate 10 having, in descending superimposed relationship, a melamine resin impregnated abrasive-loaded overlay sheet 12, a melamine resin impregnated (or alternatively, an untreated) decorative print sheet 14, and one or more plies of phenolic resin impregnated saturating grade kraft paper core sheets 16 bonded together and consolidated into a unitary decorative laminate article 10 by the high pressure pressing process described above.

Figure 2:
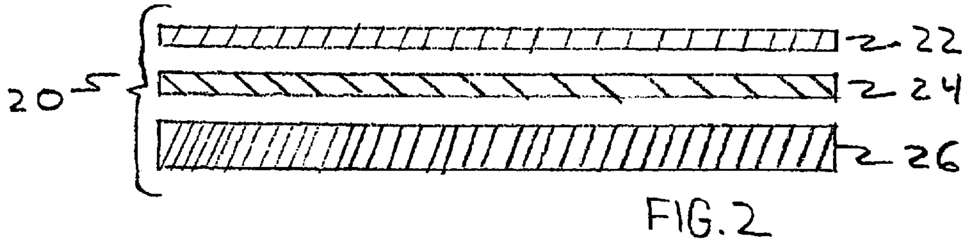
FIG. 2 is a partial, cross-sectional, exploded, elevational view of the components of the high pressure decorative laminate according to the present invention.

Referring to FIG. 2, the composition of a high pressure decorative laminate cladding 20 of the present invention is shown, which includes, in descending superimposed relationship, a melamine resin impregnated abrasive-loaded overlay sheet 22, a melamine resin impregnated (or alternatively, an untreated) decorative print sheet 24, and a core layer 26 comprising at least one sheet of polyethylene terephthalate glycol ("PETG"). It will be understood that the core layer 26 may also comprise a plurality of PETG sheets. Further, although PETG sheets are preferred, PETG in other forms (Le., in a fibrous form) could be used with the present invention.

PETG is a new class of thermoplastic polymeric materials that have recently been developed by Eastman Chemical Company, which can be extruded as continuous film or sheets. U.S. Pat. No. 5,643,666 Eckart, et al. describes the chemical composition of the PETG copolyesters as polyethylene terephthalate polyesters modified with cyclohexanedimethanol repeat units, with the cyclohexanedimethanol being either the cis- or trans-, 1,3- or 1,4-isomers (or mixtures thereof). The main dicarboxylic acid monomers are terephthalic acid or dimethylterephthalate, and the main diol monomers are ethylene glycol and cyclohexanedimethanol, although lesser amounts of other dicarboxylic acids (or their esters) and diols can also be included in the formulation. The PETG copolyester sheets of Eckart, et al. are glass-like in transparency and suitable for use in decorative glazing applications. At room temperature, the PETG sheets are extremely tough and resilient, similar to polycarbonate materials, while under pressure at elevated temperatures on the order of those used for conventional HPDL manufacture, they soften, melt and flow. Conversely, with conventional polyethylene terephthalate (PET), the melt polymerization reaction product of terephthalic acid or dimethylterephthalate and ethylene glycol has a melt temperature of about 260–270° C., and as such is not useful in the practice of the present invention. Although PETG is available in various grades and thicknesses that can be used for the present invention, it is preferable to use Eastar PETG Copolyester 6763, which is available from the Eastman Chemical Company.

As originally contemplated, the problems foreseen with PETG were whether the PETG, being a linear, saturated polyester, would even bond by itself to the melamine resin impregnated surface materials (i.e., the melamine resin treated overlay and decorative print or solid color papers), or behave more like a BOPP separator sheet (which sticks to neither melamine or phenolic resins). Further, in the latter case, it was questionable wither a bridging agent or tie sheet of the type disclosed by Chou (U.S. Pat. No. 6,159,331), with at least some polyester "character", albeit unsaturated, might be useful in facilitating bonding between the two dissimilar polymers.

Surprisingly, however, after pressing the PETG film in conjunction with conventional HPDL melamine resin treated overlay and decorative print or solid color papers, the PETG film had extremely good bond strength as evidenced by passing (after bonding to a suitable substrate, as will be detailed below) both a 7-day 50° C. water soak test and the old NEMA real cigarette resistance test (LD 1–2.04 1971), without any PETG core decorative laminate blistering or other delamination evident. It was also found that the PETG film will also bond remarkably well to a "raw", untreated decorative print sheet (under a resin-rich overlay) with similar results as with the melamine resin treated print sheet. For the best moisture resistance, use of a treated print sheet is preferred. As those skilled in the art will appreciate, any other material similar to PETG can also be used with the core layer 26. For instance, other PET polyester diol modifiers (i.e., other than cyclohexanedimethanol) could possibly create a new class of PETG copolyesters with similar properties to current PETG, which may also be useful in the practice of the present invention.

Figure 2A:
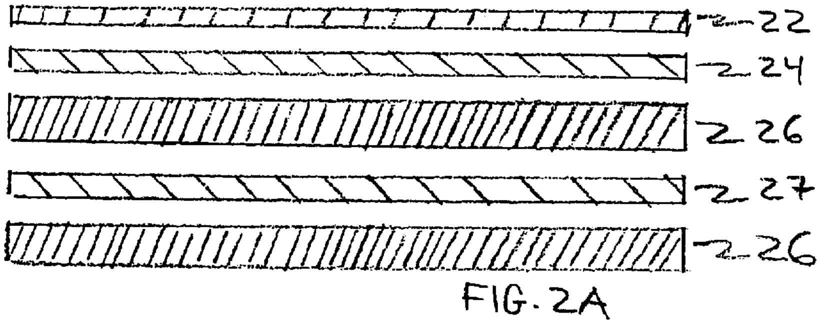
FIG. 2A is a partial, cross sectional, exploded, elevational view of another embodiment of the high pressure decorative laminate according to the present invention.

It will be understood that in addition to the core layer 26 being solely comprised of a layer or layers PETG, the core layer 26 can further comprise a layer 27 of woven or non-woven glass, carbon or polymeric fiber cloth or mat sandwiched in between two or more sheets of PETG, as shown in FIG. 2A. In such a configuration, the layer of woven or non-woven glass, carbon or polymeric fiber cloth or mat would be substantially "sealed" by the PETG layers, thus making the sealed layer water resistant. This sandwiched structure would impart additional structural characteristics to the core layer 26.

With regard to the overlay layer 22, although it is preferred that the overlay layer 22 is wear resistant, it should be noted that the overlay layer may comprise a simple overlay sheet without enhanced wear resistant properties. Further, as described above, it is possible that abrasive particles can be coated on or dispersed in the decorative layer 24. In such a configuration, the overlay layer would not be necessary for the practice of the present invention.

Figure 3:
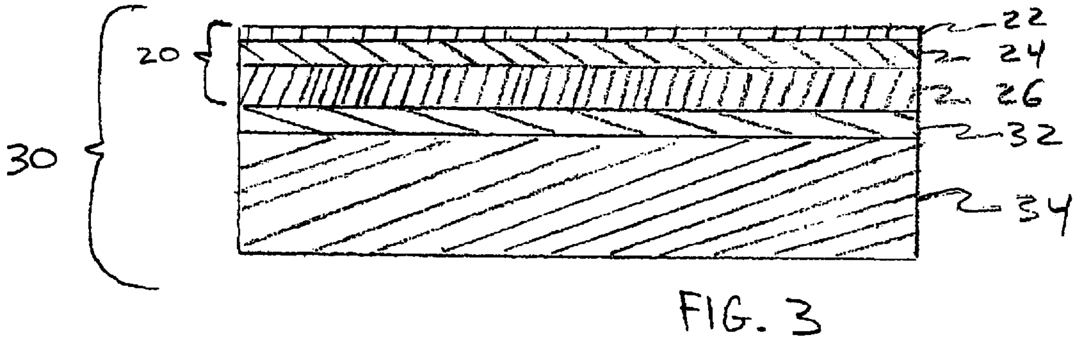
FIG. 3 is a partial, cross-sectional, elevational view of the decorative laminate flooring assembly according to the present invention.

Turning to FIG. 3, layers 22, 24 and 26 are bonded together and consolidated into a unitary decorative laminate article 20 by a slightly modified pressing process, where a lower temperature and pressure than normally used to manufacture a conventional high pressure decorative laminate are employed advantageously to control the melting and flow of the PETG layer, as will be described in detail in the example set forth below. It should be noted, however, that while the present invention is directed primarily towards decorative laminate assemblies with improved properties utilizing a high pressure decorative laminate as the preferred surfacing material bonded to a suitable substrate in a separate, two-step, process, those skilled in the art will also appreciate that the articles of the present invention could also be produced using low pressure decorative laminate or continuous laminate processes as well. Further, it will be understood that while any laminate surface finish can be used in conjunction with the present invention, a relatively low gloss, slightly to moderately deep textured surface finish is preferred when the present invention is used for flooring applications.

FIG. 3 also shows the decorative laminate assembly of the present invention, generally designated at 30, in which, in descending superimposed relationship, the melamine resin/paper surface and PETG core high pressure decorative laminate cladding 20 of the present invention is bonded by means of a suitable moisture resistant adhesive 32 to a suitable moisture resistant substrate 34. Preferably, the moisture resistant substrate is either a filled PVC sheet or cement fiberboard. As one skilled in the art will appreciate, however, any moisture resistant substrate material can be used for the substrate 34 in the practice of the present invention. It should be appreciated that "moisture resistant substrate" as that term is used herein implies the material will be dimensionally stable, and not grow or swell significantly with any prolonged or repeated exposure to, and absorption of, moisture or water. It does not imply that the substrate material must necessarily be impermeable and impervious to water. Further, although a moisture resistant substrate is preferred for the practice of the present invention, it is possible that the decorative laminate cladding 20 can be assembled with other substrates, such as HDF, MDF, particleboard, etc., with the caveat that such an assembly would not be well suited for wet or moist conditions due to the aforementioned problems with such other substrates.

Most preferably, the substrate 34 will be amenable to machining with conventional tooling (i.e., saws, routers, tenoners and the like), and be relatively inexpensive. For example, sheets or boards comprised of various virgin or recycled polymerics, or inorganic-based composites, can all be employed to achieve the desired results.

As mentioned above, however, two substrate materials in particular are considered useful and preferred for the present invention because of their respective mechanical properties. Namely, these two materials are a filled polyvinyl chloride (PVC) composite and an inorganic fiber reinforced cement board (IRCB), commonly referred to in the industry as cement fiberboard.

The PVC composite board is typically highly filled with inorganic materials such as finely powdered talc (magnesium silicate) and/or calcium carbonate. It is relatively soft, and has good mechanical and sound dampening characteristics when walked upon. As such, it is an ideal substrate for use in the practice of the present invention for wet residential applications, such as house basements and bathrooms, and for light and medium load commercial flooring in offices and the like.

Conversely, cement fiberboard is very hard and non-compressible and, as such, is well suited for use as the substrate in the practice of the present invention for heavy load commercial flooring applications (i.e., where heavy objects are placed stationary on a floor (and only moved periodically) or rolled over a floor, or where permanent deformation could be problematic, such as department stores with heavy display case pedestals and hotel lobbies). Cement fiberboard has now replaced cement asbestos board (CAB) in the industry because of carcinogenacity concerns with use of the latter, and is composed of mineral fibers with Portland cement as the binder, produced in various grades with or without small amounts of partially hydrolyzed polyvinyl alcohol/acetate, or an acrylic latex, as modifiers to enhance its internal bond strength.

Prior to the advent of decorative laminate flooring, fire retardant high pressure decorative laminates, with an otherwise conventional phenolic resin impregnated kraft paper core (typically NEMA fire retardant grades HGF and VGF) have historically been bonded to cement asbestos board, and later to cement fiberboard. Such bonding was typically performed with Indspec (formally Koppers) Penacolite G1149A/G1131B or G1124A/G1124B two-part, phenolic/resorcinol resin based adhesives, to produce fire-rated panel assemblies meeting U.S. Coast Guard, and Class I or Class A standards (ASTM E-84 or UL723 tunnel tests respectively). This product was particularly useful for bulkhead and other stringent marine applications. Surprisingly, it has been found that the decorative laminate of the present invention with a melamine resin impregnated surface and PETG core does not easily burn, and generates little smoke, suggesting that when bonded to cement fiberboard with Penacolite adhesive, the decorative laminate floor assemblies of the present invention may be particularly useful in applications where very strict fire codes are in force (i.e., apartment building hallways in major cities). Such assemblies might also be used for wall and ceiling paneling as well.

With regard to the adhesive layer 32, any adhesive system can be used that is moisture and water resistant and has an affinity for PETG (as well as the substrate material). It is preferred, though, that the adhesive layer 32 also form a continuous film when applied and is rigid when set and cured. Many such adhesive systems meet these properties. As mentioned above, Penacolite phenolic/resorcinol resin-based adhesive is useful, particularly in conjunction with cement fiberboard for heavy duty commercial and fire-rated applications. Another adhesive system which has been used to advantage to bond the PETG core decorative laminate of the present invention to both filled PVC and cement fiberboard substrates is Daubert Chemical Company's Daubond DC-8855A/DC-8855B, a two-part epoxy modified polyurethane, which has the advantage of being able to be used in a cold-pressing operation. This adhesive exhibits extremely good water resistance and bond strength, even when the decorative laminate's PETG back is unsanded (which is preferred in the present invention), with the proviso that BOPP be used as the separator sheet during pressing, such that no release agent contamination of the PETG back occurs, which would interfere with bonding. Conversely, examples of adhesives and "glues" that are not recommended include elastomeric, neoprene-based "contact" adhesives, polyvinyl acetate (PVAc) emulsions, polyvinyl alcohol (PVA), urea-formaldehyde (UF), casein or other animal-based glues, due to either poor moisture resistance, mechanical strength or fungistatic properties.

A preferred embodiment of the present invention will be described in detail in the following example, where it should be appreciated that the scope of this instant invention is not limited in any way by the description of the preferred embodiments set forth herein. The following specific example is provided to illustrate further aspects and unique advantages of the present invention, and other features and embodiments should become apparent to those skilled in the art. The example is set forth for illustration only, and should not be construed as limitations on the scope of the present invention.

EXAMPLE

A melamine-formaldehyde resin was prepared by normal procedures familiar to those versed in the art, with a 1.4/l formaldehyde/melamine mole ratio, and co-reacted with 7% dicyandiamide based on melamine and formaldehyde solids, in a 50% aqueous solution at 92° C. The following resin blend was then prepared with this plasticized melamine resin, with all parts being parts by weight:

| | |
|---|---|
| 69.0 parts | melamine resin |
| 4.6 parts | polyethylene glycol 600 MW (Union Carbide Carbowax 600) |
| 5.7 parts | Cymel 385 partially methylated melamine resin (CyTec Industries) |
| 20.5 parts | water |
| 0.1 parts | MoldWiz INT-1E-11S release agent (Axel Plastics) |
| 0.1 parts | Cycat 4040 p-toluene sulfonic acid catalyst solution (CyTec Industries) |
| 100.0 parts | Total |

Those versed in the art will appreciate that other polyfunctional amino and aldehydic compounds can be used to prepare the base resin, and other thermosetting polymers, such as Polyesters or acrylics, may be useful as the surface resin for certain applications. However, for the practice of the present invention, use of a melamine-formaldehyde resin is preferred.

Mead Corporation clear, abrasive loaded overlay (code 85062), with a 34 pound per ream basis weight, was treated with the above resin blend to a resin content of about 64–66% and a volatile content of about 6–8%. The abrasive overlay is sized with enough alumina particles of sufficient diameter to result in a 12,000 cycle Taber abrasion rating (NEMA Wear Resistance Test Method LD 3–3.13 1995). The resin content is defined as the difference between the treated weight of the paper and the initial raw weight of the paper, divided by the treated weight of the paper and expressed as a percentage, and the volatile content is defined as the difference between the treated weight of the paper and the bone dry treated weight of the paper, divided by the treated weight of the paper and expressed as a percentage.

Similarly, a printed decorative paper, with a 65 pound per ream basis weight, was treated to a resin content of about 39–41% and a volatile content of about 6–8% with the same resin blend. The print paper had on its top surface a rotogravure printed design simulating multi-colored ceramic tiles surrounded by cementitious grout lines in a checkerboard pattern, said tiles being approximately 11⅝ inches square with approximately ⅜ inch wide grouts lines in the length direction of the web, 1 inch wide grout lines in the cross-web direction, and ½ inch wide grout lines along both edges of the nominal 4 foot wide web (the wider cross-web and edge grout lines needed to accommodate subsequent saw kerf cutting and secondary trimming losses).

A press pack was then assembled on a carrier tray with the following materials in ascending superimposed relationship: 6 plies of untreated kraft "cushion", a phenolic textured plate, 1 ply of BOPP film, 1 ply of Ivex Corporation LC-53 texturing/release paper (coated side facing up), 1 ply of treated overlay, 1 ply of treated print (printed side facing down), 1 sheet of 0.020 inch thick PETG (with its protective film removed from the bottom side and retained on the top side, 1 ply of BOPP film, 1 sheet of 0.020 thick PETG (with its protective film removed from the top side and retained on the bottom side, 1 ply of treated print (printed side facing up), 1 ply of treated overlay, 1 ply of LC-53 texturing/release paper (coated side facing down), 1 ply of BOPP film and then another phenolic textured plate, thus completing the build-up of one laminate doublet. The build-up was continued in the same sequence until the completed press pack, with 6 plies of untreated kraft cushion on top, contained a total of 4 phenolic textured plates with 3 laminate doublets (pairs) sandwiched in between. The grade of PETG sheet used was Eastman Chemical Company Eastar PETG Copolyester 6763.

The press pack so assembled was then loaded into a high pressure flat bed press, which was then closed and pressurized to about 1100 psig specific pressure. The press pack, so configured, was then heated to between 125° C.–127° C. in about 20 minutes, and held at that temperature for 25–30 minutes before rapidly cooling to near room temperature in about 20 minutes, after which press pressure was released, the press opened and the press pack removed. Although, as those skilled in the art will recognize, other types of newer generation equipment can be used to produce high pressure (and low pressure) decorative laminates, for example a continuous double-belt press, a single or restricted opening "short cycle" flat bed press, or an isothermal "hot discharge" flat bed press, a conventional multi-opening press is still the type most used in the art, and most suited to the practice of the present invention.

It should be stressed that the press pack top temperature with the PETG grade used and at the preferred press pressure stated, is critical in that below about 125° C. the PETG does not soften and flow properly, and above about 127° C. it melts and exudes excessively from the press. Use of other PETG grades may require different temperature and pressure conditions for optimum results. The phenolic textured plates were subsequently removed sequentially, the laminate doublets recovered and then separated into individual laminate sheets. The protective film was stripped off the backs of the laminates, and their edges then trimmed without any back sanding. The resultant laminates thus obtained were about 1/32 inch thick.

Panel assemblies were then prepared by bonding the PETG core laminates of the present invention so prepared to 3/32 inch thick filled PVC sheets, using the Daubond DC-8855 adhesive system previously identified at a spread rate of about 0.03 pounds per square foot, and then pressing the prepared assembles, stacked face up and interleaved with BOPP film, with 6 plies of raw kraft cushion top and bottom, in a low pressure, flat bed hydraulic press. Bonding was affected by cold pressing the panel assemblies at about 40 psig specific pressure for about 12 hours. The final pressed decorative laminate panel assemblies obtained were about ⅛ inch thick.

The improved decorative laminate assemblies of the present invention, so prepared by the method described in detail above, were then rough cut crosswise through the centers of the 1 inch wide grout lines, an then the nominal 1 foot by 4 foot tile "planks" (each containing four square tiles) were carefully edge trimmed leaving 3/16 inch wide peripheral grout lines, with a 5 degree back cut of the vinyl substrate to insure neat butt joints. Finally, the tile planks so prepared were installed on a cement test floor, to evaluate "real world" long-term wear, damage and moisture effects, using Macklanburg-Duncan MD 919 Vinyl Back Flooring Adhesive, suitable for use with both wood-based and concrete subfloors, by the prescribed manner using a trowel with a spread rate of 150 square feet per gallon. The final floor installation was comprised of square tiles surrounded by ⅜ inch wide grout lines on 12 inch centers.

Comparative impact resistance testing of a sample of the above decorative laminate assembly flooring made in accordance with the present invention, and other selected flooring products, all bonded to concrete patio tiles and tested in accordance with the NEMA LD 3–3.8 1995 Ball Impact Resistance test method, except replacing the ¾ inch thick, 45 pound per cubic foot medium density particleboard substrate with a concrete slab, was conducted with the following results as shown in Table III below:

TABLE III

| | Impact Resistance (Inches) |
|---|---|
| 0.8 mm Low Pressure Melamine/HDF Flooring (1) | <20 |
| Conventional Phenolic/Kraft Core HPDL Clad Filled PVC (2) | <20 |
| PETG Core HPDL Clad Filled PVC (3) | 20–40 |
| PETG Core HPDL Clad Filled PVC (4) | 40–60 |

Notes:
(1) Formica Flooring, usually installed as a floating floor.
(2) LG Prime High Pressure Laminate Flooring, a product of LG Chem, a subsidiary of Lucky Goldstar LG Group (South Korea), produced in accordance with U.S. Pat. No. 6,093,473.
(3) Produced in accordance with the present invention as described in the above example, except that the surface components were treated only with the neat dicyandiamide modified melamine resin.
(4) Produced in accordance with the present invention as described in the above example, with the surface components treated with the melamine resin, Cymel 385, PEG 600 blend as the preferred embodiment in the above example.

While the preferred embodiment of this invention uses a high pressure decorative laminating process, utilizing a high pressure, multi-opening, flat bed hydraulic press to produce the PETG core decorative laminate, it should be recognized that other laminating processes are applicable in the practice of this invention. Specifically, the PETG core decorative laminate component of the present invention can be produced with a low pressure, short cycle pressing process if a suitable separator material such as BOPP film and carrier tray are also provided. It is also envisioned that the entire decorative laminate assembly might be produced by such a process in a single operation, with the substrate of choice pre-primed with a suitable adhesive. Additionally, a continuous double-belt pressing process might be utilized advantageously to produce the decorative laminate component in sheet or roll form, where continuous webs of texturing release paper, the surface materials, continuous films of PETG and a suitable separator material such as BOPP are fed into the press, which upon exiting as a continuous laminate, is quickly cooled by means of cooling drums, with edge trimming and optional sheeting thereafter. It is also envisioned that the entire decorative laminate assembly might be produced by a single-step continuous process, wherein the selected substrate is pre-primed the a suitable adhesive, and the discrete boards fed into the press along with the continuous textured release paper, surface material webs and PETG films of the decorative laminate component (without the BOPP separator).

In addition, as another embodiment of the present invention, depending on the nature and properties of the substrate used and its thickness, the flooring tiles and planks so produced could be provided with a tongue and groove, or other integral, edge treatment, or be otherwise prepared to accept a separate mechanical locking device, as a joinery system. Further, it should also be recognized that while the preferred embodiments of this invention are directed primarily to flooring applications, and particularly wet area or fire-rated flooring applications, the articles so produced are also useful for more mundane flooring applications, as well as other applications where decorative laminate panel assemblies find use and are desirable.

The foregoing description of a preferred embodiment of the invention has been presented for purposes of illustration and description, and is not intended to be exhaustive or to limit the invention to the precise form disclosed. The description was selected to best explain the principles of the invention and their practical application, to enable others skilled in the art to best utilize the invention in various embodiments and various modifications as are suited to the particular use contemplated. It is intended that the scope of the invention not be limited by the specification, but be defined by the claims set forth below.

We claim:

1. A decorative laminate comprising:

a decorative layer comprising a thermosetting resin impregnated cellulosic material; and a core layer below said decorative layer comprising polyethylene terephthalate glycol.

2. The decorative laminate of claim 1, wherein said decorative laminate is a high pressure decorative laminate.

3. The decorative laminate of claim 1, wherein said decorative laminate is a low pressure decorative laminate.

4. The decorative laminate of claim 1, wherein said decorative laminate is a continuous laminate.

5. The decorative laminate of claim 1, wherein said polyethylene terephthalate glycol is at least one sheet of polyethylene terephthalate glycol.

6. The decorative laminate of claim 1, wherein said core layer further comprises at least one layer of a woven or non-woven sheet formed from a material selected from the group consisting of glass, carbon and polymeric fiber.

7. The decorative laminate of claim 6, wherein said at least one layer is sandwiched in between two polyethylene terephthalate glycol sheets.

8. The decorative laminate of claim 1, wherein said decorative laminate further comprises an overlay layer on top of said decorative layer.

9. The decorative laminate of claim 8, wherein said overlay layer includes abrasive particles.

10. The decorative laminate of claim 9, wherein said abrasive particles comprise alumina.

11. The decorative laminate of claim 8, wherein said overlay layer is impregnated with a melamine formaldehyde resin.

12. The decorative laminate of claim 1, wherein said decorative layer is impregnated with a melamine formaldehyde resin.

13. The decorative laminate of claim 1, wherein said decorative layer includes a printed pattern.

14. A decorative laminate comprising:

a wear resistant layer comprising a thermosetting resin impregnated cellulosic material;

a decorative layer comprising a thermosetting resin impregnated cellulosic material; and a core layer below said decorative layer comprising at least one sheet of polyethylene terephthalate glycol.

15. The decorative laminate of claim 14, wherein said decorative laminate is a high pressure decorative laminate.

16. The decorative laminate of claim 14, wherein said decorative laminate is a low pressure decorative laminate.

17. The decorative laminate of claim 14, wherein said decorative laminate is a continuous laminate.

18. The decorative laminate of claim 14, wherein said wear resistant layer is an overlay layer on top of said decorative layer, said overlay layer including abrasive particles.

19. The decorative laminate of claim 18, wherein said abrasive particles comprise alumina.

20. A decorative laminate assembly comprising,:

(a) a decorative laminate top layer assembly comprising,:

(i) a decorative layer comprising a thermosetting resin impregnated cellulosic material, (ii) a core layer below said decorative layer comprising polyethylene terephthalate glycol; and (b) a substrate attached to said decorative laminate top layer assembly.

21. The decorative laminate of claim 20, wherein said decorative laminate is a high pressure decorative laminate.

22. The decorative laminate of claim 20, wherein said decorative laminate is a low pressure decorative laminate.

23. The decorative laminate of claim 20, wherein said decorative laminate is continuous laminate.

24. The decorative laminate of claim 20, wherein said polyethylene terephthalate glycol is at least one sheet of polyethylene terephthalate glycol.

25. The decorative laminate of claim 20, wherein said core layer further comprises at least one layer of a woven or non-woven sheet formed from a material selected from the group consisting of glass, carbon or polymeric fiber.

26. The decorative laminate of claim 25, wherein said at least one layer is sandwiched in between two polyethylene terephthalate glycol sheets.

27. The decorative laminate of claim 20, wherein said decorative laminate further comprises an overlay layer on top of said decorative layer.

28. The decorative laminate of claim 27, wherein said overlay layer includes abrasive particles.

29. The decorative laminate assembly of claim 20, wherein said substrate is water resistant.

30. The decorative laminate assembly of claim 29, wherein said water resistant substrate comprises polyvinyl chloride.

31. The decorative laminate assembly of claim 29, wherein said water resistant substrate comprises fiber reinforced cement board.

32. The decorative laminate assembly of claim 20, wherein said substrate is attached to said top layer assembly with a water resistant adhesive.

33. A decorative laminate assembly comprising,:

(a) a high pressure decorative laminate top layer assembly comprising,:

(i) a wear resistant layer;

(ii) a decorative layer comprising a thermosetting resin impregnated cellulosic material; and (iii) a core layer below said decorative layer comprising polyethylene terephthalate glycol;

(b) a water resistant adhesive layer;

(c) a water resistant substrate, wherein said water resistant adhesive layer bonds together said top layer assembly to said water resistant substrate.

34. The decorative laminate of claim 33, wherein said decorative laminate is a high pressure decorative laminate.

35. The decorative laminate of claim 33, wherein said decorative laminate is a low pressure decorative laminate.

36. The decorative laminate of claim 33, wherein said decorative laminate is continuous laminate.

37. The decorative laminate of claim 33, wherein said polyethylene terephthalate glycol is at least one sheet of polyethylene terephthalate glycol.

38. The decorative laminate of claim 33, wherein said wear resistant layer is an overlay layer on top of said decorative layer, said overlay layer including abrasive particles.

39. The decorative laminate assembly of claim 33, wherein said water resistant substrate comprises polyvinyl chloride.

40. The decorative laminate assembly of claim 33, wherein said water resistant substrate comprises fiber reinforced cement board.

41. The decorative laminate of claim 33, wherein said core layer further comprises at least one layer of a woven or non-woven sheet formed from a material selected from the group consisting of glass, carbon or polymeric fiber.

42. The decorative laminate assembly of claim 41, wherein said at least one layer is sandwiched in between two polyethylene terephthalate glycol sheets.

43. A method for producing a decorative laminate comprising:

(a) assembling a wear resistant layer, a decorative layer comprising a thermosetting resin impregnated cellulosic material and a core layer below said decorative layer, said core layer comprising polyethylene terephthalate glycol; and (b) subjecting said assembly to heat and pressure, thereby laminating said assembly.

44. The method of claim 43, wherein said wear resistant layer is an overlay layer, said overlay layer including abrasive particles.

45. The method of claim 43, wherein said polyethylene terephthalate glycol is 0.020 inches thick.

46. The method of claim 43, wherein said pressure is between 1000 and 1200 psig.

47. The method of claim 46, wherein said temperature is between 125° C. and 127° C.

48. The method of claim 47, wherein said beat and pressure is maintained for 25–30 minutes.

49. The method of claim 43, further comprising bonding said overlay layer, decorative layer, and core layer to a water resistant substrate after said subjecting to heat and pressure laminating step.

50. The method of claim 49, wherein said water resistant substrate comprises PVC.

51. The method of claim 49, wherein said water resistant substrate comprises fiber reinforced cement board.

52. The method of claim 49, wherein said polyethylene terephthalate glycol comprises at least one sheet of polyethylene terephthalate glycol.

53. The decorative laminate of claim 1, wherein said cellulosic material is impregnated prior to lamination.

54. The decorative laminate of claim 1, wherein said cellulosic material is impregnated during the lamination process.

55. The decorative laminate of claim 14, wherein said cellulosic material of at least said decorative layer is impregnated prior to lamination.

56. The decorative laminate of claim 14, wherein said cellulosic material of at least said decorative layer is impregnated during the lamination process.

* * * * *